July 1, 1924.
F. L. LANPHERE
1,499,671
METHOD OF TREATING TREES
Filed June 17, 1922
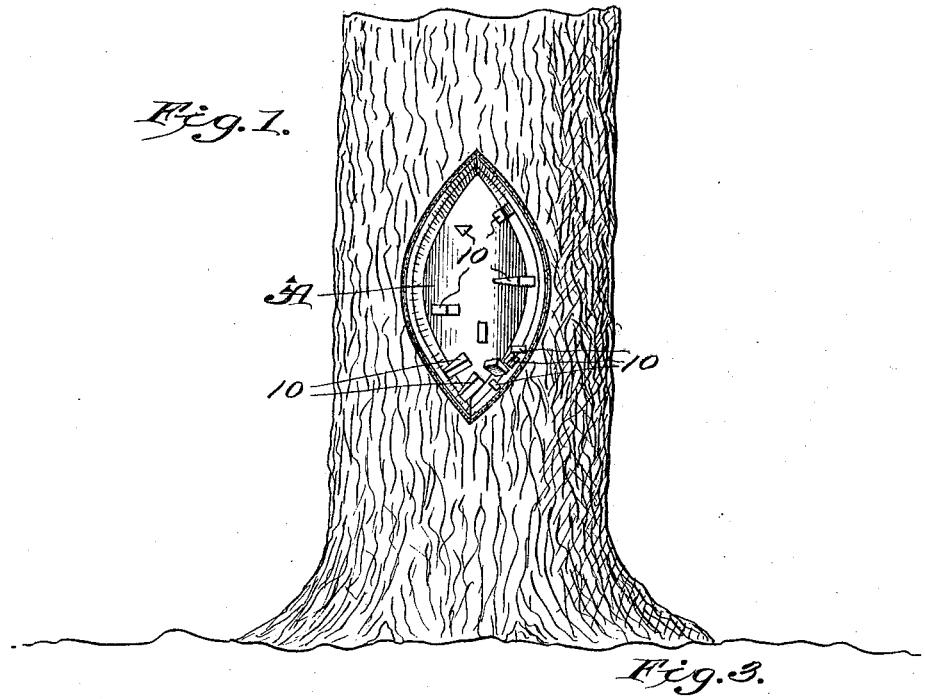
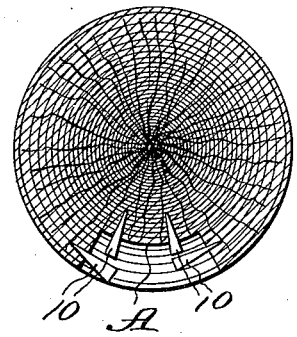
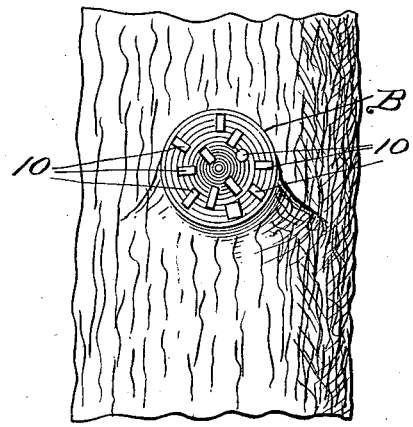
F. L. Lanphere,
INVENTOR
BY Victor J. Evans
ATTORNEY
WITNESSES Patented July 1, 1924.

1,499,671

UNITED STATES PATENT OFFICE.

FRANK L. LANPHERE, OF SALINA, KANSAS.

METHOD OF TREATING TREES.

Application filed June 17, 1922. Serial No. 568,944.

*To all whom it may concern:*

Be it known that I, FRANK L. LANPHERE, a citizen of the United States, residing at Salina, in the county of Saline and State of Kansas, have invented new and useful Improvements in Methods of Treating Trees, of which the following is a specification.

This invention relates to horticulture, particularly to tree treatment, and has for its object the provision of a novel method of treating wounds in trees for the purpose of preventing bleeding or the accumulation of "slime flux" so that the tree will be maintained in healthy condition and prevented from decaying or dying.

An important object is the provision of a method of this character which will be simple and inexpensive, efficient and positive in service, and a general improvement in the art.

In the carrying out of my process I make use of wedges which are driven into the wound for the purpose of compressing the fiber of the tree and thus closing the pores, pith holes, bore holes, weather-checks, cracks, splits and the like.

In order that a better understanding of the process may be had reference is made to the accompanying drawings, in which:

Figure 1 is an elevation of a portion of a tree trunk having a wound therein treated by my method, Figure 2 is a sectional view and Figure 3 is a view of a cut off limb showing it treated by my method.

A wound "A" in a tree trunk or along a large branch or limb is treated by driving in a plurality of wedges 10 into the bottom of the cavity and also the sides thereof as clearly indicated in Figure 1. The wedges are so placed as to enter between the fibers, that is they must not be disposed transversely as this would cut the fiber. The size and shape of these wedges may of course vary depending upon the dimensions of the wound and the size and character of the tree. The number of wedges and their length must be gaged with discretion but a sufficient number must be used to compress the fibers of the wood as to close the pores so that bleeding cannot occur or "slime flux" accumulate.

Assuming that it is desired to treat a tree having a wound therein, the wound is first excavated, i. e. all the decayed wood is removed forming a cavity which is then allowed to weather by action of the elements for a sufficient length of time to permit the surface of the cavity to harden except at those points or areas where the slime comes out. Then all the openings, pith holes, bore holes, checks, splits are forcibly closed by driving in wedges of the proper shape and size and in sufficient number to completely and firmly close the openings by compressing all the soft or damp wood cells around the openings, the wedges to conform to the shape of openings. Bore holes are of different sizes, ranging from $\frac{1}{16}$ inch up to $\frac{1}{2}$ inch in diameter thus requiring different sizes of wedges. Pith holes are ordinarily from $\frac{1}{8}$ inch up to $\frac{1}{2}$ inch in diameter and also require different sizes of wedges. Weather checks or splits may be from $\frac{1}{2}$ inch up to 3 inches long and from a mere crack to $\frac{1}{8}$ inch wide, the size of wedges to be governed by the size of the opening. For example take a cavity 19 inches long, 6 inches wide and 5 inches deep, such as occurred in actual practice. There were also two pith holes, three bore holes and two weather checks or splits. The pith holes were $\frac{1}{2}$ inch in diameter which necessitated using round wedges $\frac{1}{2}$ inch in diameter and $2\frac{1}{2}$ inches long. One of the bore holes was round and $\frac{3}{8}$ inch in diameter, so use was made of a $\frac{3}{8}$ inch round wedge $2\frac{1}{2}$ inches long. The other two bore holes were oblong or oval so use was made of an oval wedge in each, $\frac{5}{8}$ inch thick at its minor diameter and $\frac{3}{4}$ inch thick at its major diameter and $2\frac{1}{2}$ inches long. For the weather checks or splits flat wedges were used. One check was $\frac{3}{4}$ inch long and $\frac{1}{16}$ inch wide. In this check I used a flat wedge $\frac{1}{4}$ inch thick, 1 inch wide and $1\frac{1}{4}$ inches long. The other split was $1\frac{1}{4}$ inches long and $\frac{1}{8}$ inch wide so I employed a flat wedge $\frac{1}{4}$ inch thick, $\frac{1}{2}$ inch wide and $1\frac{1}{2}$ inches long. The weather checks or splits naturally run with the grain so that the flat wedges used are driven with the grain. In other respects or under other circumstances no attention is paid to the grain of the wood.

In the particular cavity described for the sake of example, there might have been or could have been more bore holes or no bore holes, thus adding to or decreasing correspondingly the number of wedges necessary to effect proper treatment. There might also have been more or less leaking checks, but the mode of treatment specified is one which occurred in actual practice in the treatment of a given wound having the various complications referred to.

In case of a cut off limb shown at B treatment is made in the same way except that the wedges would naturally be smaller and fewer in number. The material from which the wedges are constructed may also vary and may be such as found most satisfactory in actual practice.

From the foregoing description and a study of the drawings it will be apparent that I have thus provided a simple method which will effectually operate to preserve trees from decay, the method being easily carried out and involving very little labor and expense.

Having thus described my invention I claim:

1. A method of treating trees consisting in compressing the fiber at a wound to close the pores.

2. A method of treating tree wounds consisting in driving wedges into the base and sides of the wound to compress the fibers for closing the pores.

3. A method of treating tree wounds consisting in wedging together the fibers of the wood at the wound whereby to effect compression and close the pores.

In testimony whereof I affix my signature.

FRANK L. LANPHERE.